United States Patent
Choi et al.

(10) Patent No.: US 11,146,320 B2
(45) Date of Patent: Oct. 12, 2021

(54) METHOD FOR TERMINAL COMMUNICATING IN MMWAVE COMMUNICATION SYSTEM AND TERMINAL

(71) Applicant: LG ELECTRONICS INC., Seoul (KR)

(72) Inventors: Kukheon Choi, Seoul (KR); Hyunsoo Ko, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 16/301,261

(22) PCT Filed: Jun. 8, 2016

(86) PCT No.: PCT/KR2016/006065
§ 371 (c)(1),
(2) Date: Nov. 13, 2018

(87) PCT Pub. No.: WO2017/213276
PCT Pub. Date: Dec. 14, 2017

(65) Prior Publication Data
US 2020/0322021 A1    Oct. 8, 2020

(51) Int. Cl.
*H04B 7/06*     (2006.01)
*H04L 5/14*     (2006.01)
(Continued)

(52) U.S. Cl.
CPC ......... *H04B 7/0626* (2013.01); *H04B 7/0617* (2013.01); *H04L 5/1469* (2013.01);
(Continued)

(58) Field of Classification Search
CPC .. H04B 7/0626; H04B 7/0617; H04B 7/0665; H04L 5/1469; H04L 1/18; H04W 48/12;
(Continued)

(56) References Cited

U.S. PATENT DOCUMENTS

2013/0109324 A1   5/2013  Garrett et al.
2013/0242787 A1*  9/2013  Sun ...................... H04W 24/10
                                                            370/252
(Continued)

FOREIGN PATENT DOCUMENTS

KR        20130127376 A  * 11/2013 ........... H04B 7/0695
KR      1020130127376       11/2013
(Continued)

OTHER PUBLICATIONS

Multi-Connectivity in 5G mmWave Cellular Networks, Glordani, Marco, Apr. 30, 2016 (Year: 2016).*
(Continued)

*Primary Examiner* — Ayaz R Sheikh
*Assistant Examiner* — Louis Samara
(74) *Attorney, Agent, or Firm* — Lee, Hong, Degerman, Kang & Waimey

(57) ABSTRACT

Disclosed is a terminal for performing a mmWave communication method and a mmWave communication method comprising: receiving information relating to a basic UL/DL configuration from a mmWave base station; generating statistical information relating to a mmWave downlink channel using a reference signal received from the mmWave base station, according to the basic UL/DL configuration; transmitting the statistical information to the mmWave base station through a legacy uplink; and receiving, from the mmWave base station, information relating to the UL/DL configuration which has been modified according to the statistical information.

10 Claims, 20 Drawing Sheets

(51) Int. Cl.
  *H04W 48/12* (2009.01)
  *H04W 72/04* (2009.01)
  *H04W 72/08* (2009.01)
(52) U.S. Cl.
  CPC ......... *H04W 48/12* (2013.01); *H04W 72/044* (2013.01); *H04W 72/085* (2013.01)
(58) Field of Classification Search
  CPC . H04W 72/044; H04W 72/085; H04W 24/02; H04W 24/10; H04W 72/042
  See application file for complete search history.

(56) References Cited

U.S. PATENT DOCUMENTS

| | | | |
|---|---|---|---|
| 2014/0198682 A1 | 7/2014 | Ko et al. | |
| 2016/0359531 A1* | 12/2016 | Suh | H04B 7/0665 |
| 2017/0111886 A1* | 4/2017 | Kim | H04W 72/042 |
| 2017/0188314 A1* | 6/2017 | Mueck | H04W 24/02 |

FOREIGN PATENT DOCUMENTS

| | | | |
|---|---|---|---|
| KR | 20170135549 A * | 12/2017 | |
| WO | 2011108846 | 9/2011 | |
| WO | 2015099497 | 7/2015 | |
| WO | WO-2017016393 A1 * | 2/2017 | ............... H04L 1/18 |

OTHER PUBLICATIONS

PCT International Application No. PCT/KR2016/006065, Written Opinion of the International Searching Authority dated Feb. 24, 2017, 31 pages.

\* cited by examiner (a) Control-plane protocol stack (b) User-plane protocol stack

| | Omni cell | 0°<θ<60° mmWave cell | 60°<θ<120° mmWave cell | 120°<θ<180° mmWave cell | 180°<θ<240° mmWave cell | 240°<θ<300° mmWave cell | 300°<θ<360° mmWave cell |
|---|---|---|---|---|---|---|---|
| mmWave temporary cell ID | 001 | 010 | 011 | 100 | 101 | 110 | 111 |

Assumption: length of modified channel coherence time in specific cell: 4 TTIs (a)

(b)

METHOD FOR TERMINAL COMMUNICATING IN MMWAVE COMMUNICATION SYSTEM AND TERMINAL

CROSS-REFERENCE TO RELATED APPLICATIONS

This application is the National Stage filing under 35 U.S.C. 371 of International Application No. PCT/KR2016/006065, filed on Jun. 8, 2016, the contents of which are all hereby incorporated by reference herein in their entirety.

TECHNICAL FIELD

The present invention relates to a wireless communication system, and more particularly, to a communication method for a terminal in a millimeter wave (mmWave) communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system or LTE-A (LTE-Advanced) system. Details of the technical specifications of the UMTS and E-UMTS may be understood with reference to Release 7 to Release 13 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE-A, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

An object of the present invention is to provide a stable communication mechanism between a terminal (user equipment) and a base station for a mmWave communication system using ultra-high frequency bands.

Another object of the present invention is to eliminate transmission ambiguity due to beamforming cells, which are configured by beamforming capability of a base station.

A further object of the present invention is to prevent information feedback by a user equipment when a mmWave channel is changed from being outdated.

The technical problems solved by the present invention are not limited to the above technical problems and other technical problems which are not described herein will become apparent to those skilled in the art from the following description.

Technical Solution

According to an aspect of the present invention, there is provided a communication method. The method may include: receiving information on a default uplink/downlink (UL/DL) configuration from a mmWave Base Station (BS); generating statistical information on a mmWave DL channel using a reference signal received from the mmWave BS according to the default UL/DL configuration; transmitting the statistical information to the mmWave BS via legacy UL; and receiving, from the mmWave BS, information on a UL/DL configuration that is modified based on the statistical information.

The statistical information may include information on changes of the mmWave DL channel and information on average blocking probability of mmWave DL.

The information on the default UL/DL configuration may be received from a mmWave System Information Block (SIB) broadcast by the mmWave BS, and the communication method may further include aligning synchronization of mmWave UL, mmWave DL, and the legacy UL using the mmWave SIB.

The mmWave communication system may be configured to a Time Division Duplex (TDD) system.

The statistical information may be information on any one cell among a plurality of beamforming cells that can be configured by the mmWave BS.

The communication method may further include performing communication with the mmWave BS in the any one cell according to the modified UL/DL configuration According to another aspect of the present invention, there is provided a User Equipment (UE). The UE may include: a transmitter; a receiver; and a processor connected to the transmitter and the receiver. In this case, the processor may be configured to: control the receiver to receive information on a default uplink/downlink (UL/DL) configuration from a mmWave Base Station (BS); generate statistical information on a mmWave DL channel using a reference signal received from the mmWave BS according to the default UL/DL configuration; control the transmitter to transmit the statistical information to the mmWave BS in legacy UL; and control the receiver to receive, from the mmWave BS, information on a UL/DL configuration that is modified based on the statistical information.

Advantageous Effects

According to embodiments of the present invention, the following effects can be achieved.

First, a UE can efficiently communicate with a BS in a mmWave communication system even if a channel therebetween is drastically changed.

Second, it is possible to increase the stability of feedback information transmitted from a UE with respect to various individual beamforming cells configured by a mmWave BS.

Third, since feedback from a UE is not outdated, a mmWave BS can accurately reflect channel changes in performing communication with the UE.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
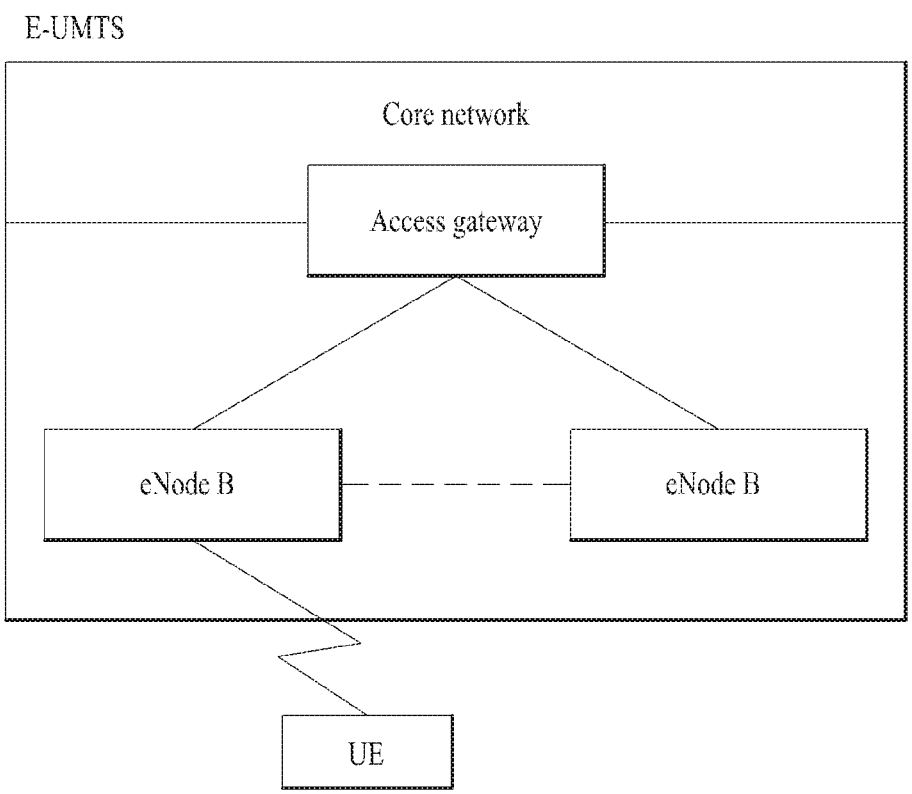
FIG. 1 is a schematic diagram of an E-UMTS network structure as one example of a wireless communication system.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. LTE/LTE-A System Overview

Figure 2:
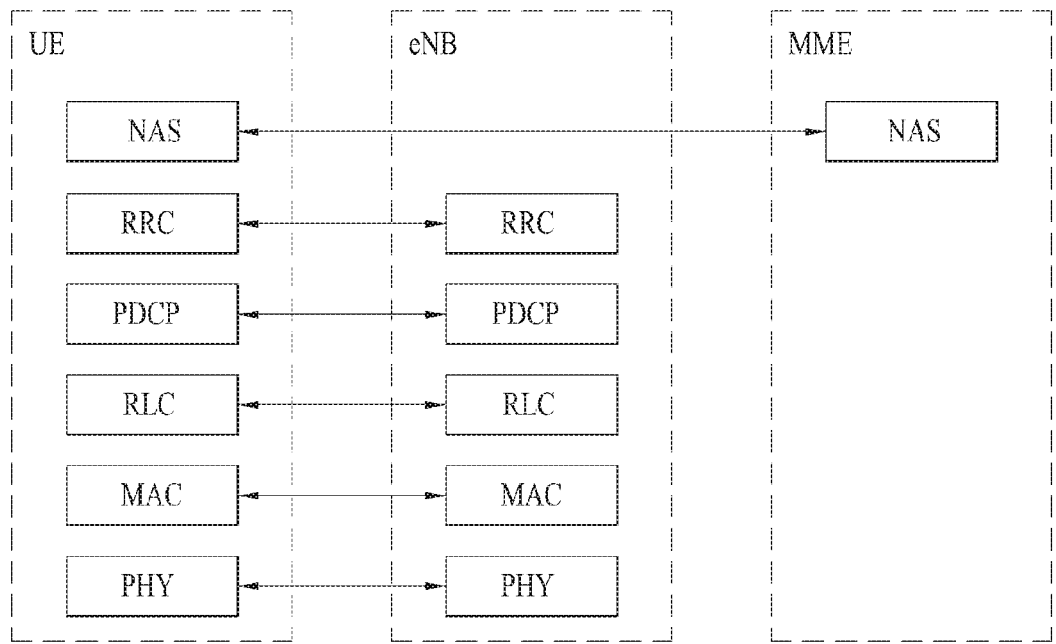
FIG. 2 illustrates structures of control and user planes of a radio interface protocol between a user equipment and E-UTRAN based on 3GPP radio access network standard.
Figure 2:
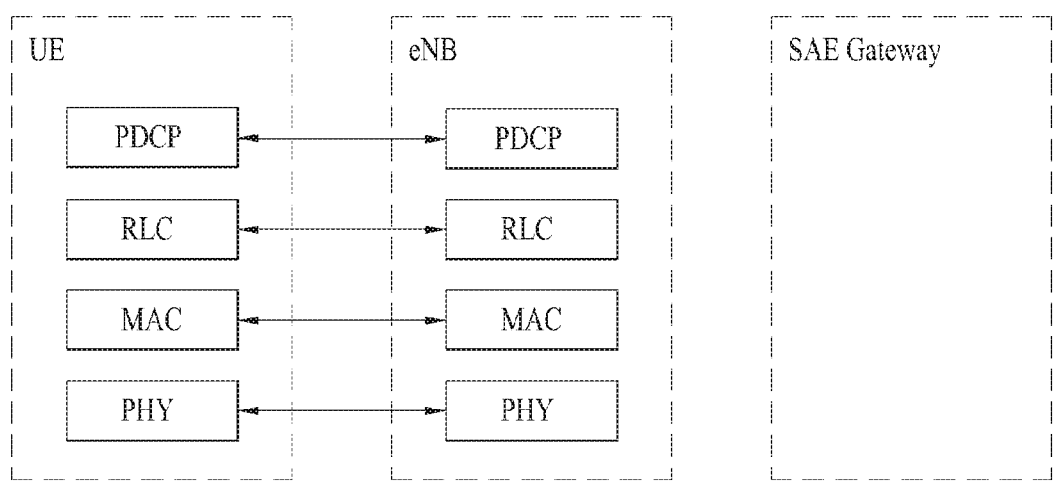

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
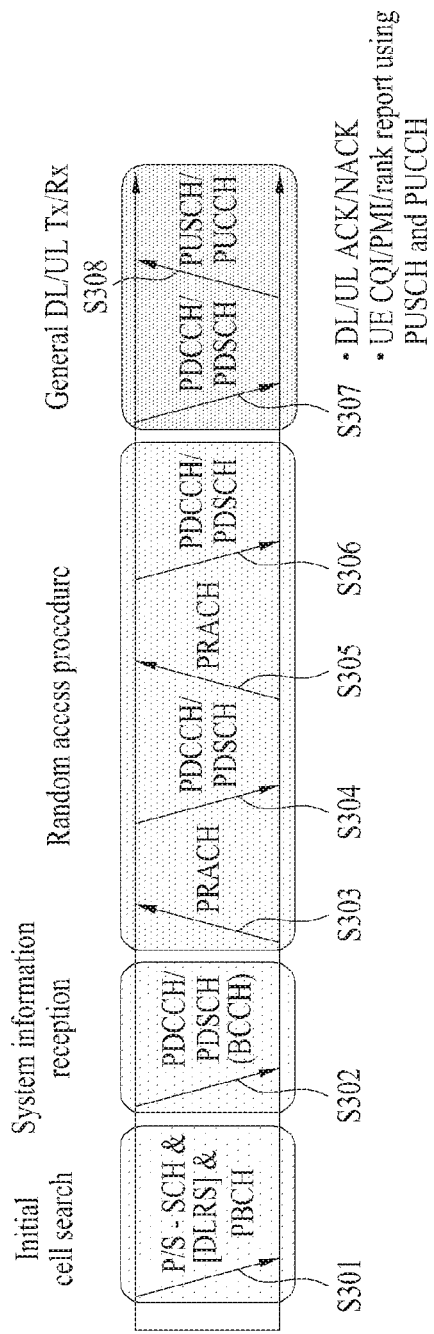
FIG. 3 illustrates physical channels used for a 3GPP LTE system and a general signal transmission method using the same.

FIG. 3 is a diagram illustrating physical channels used in a 3GPP LTE/LTE-A system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
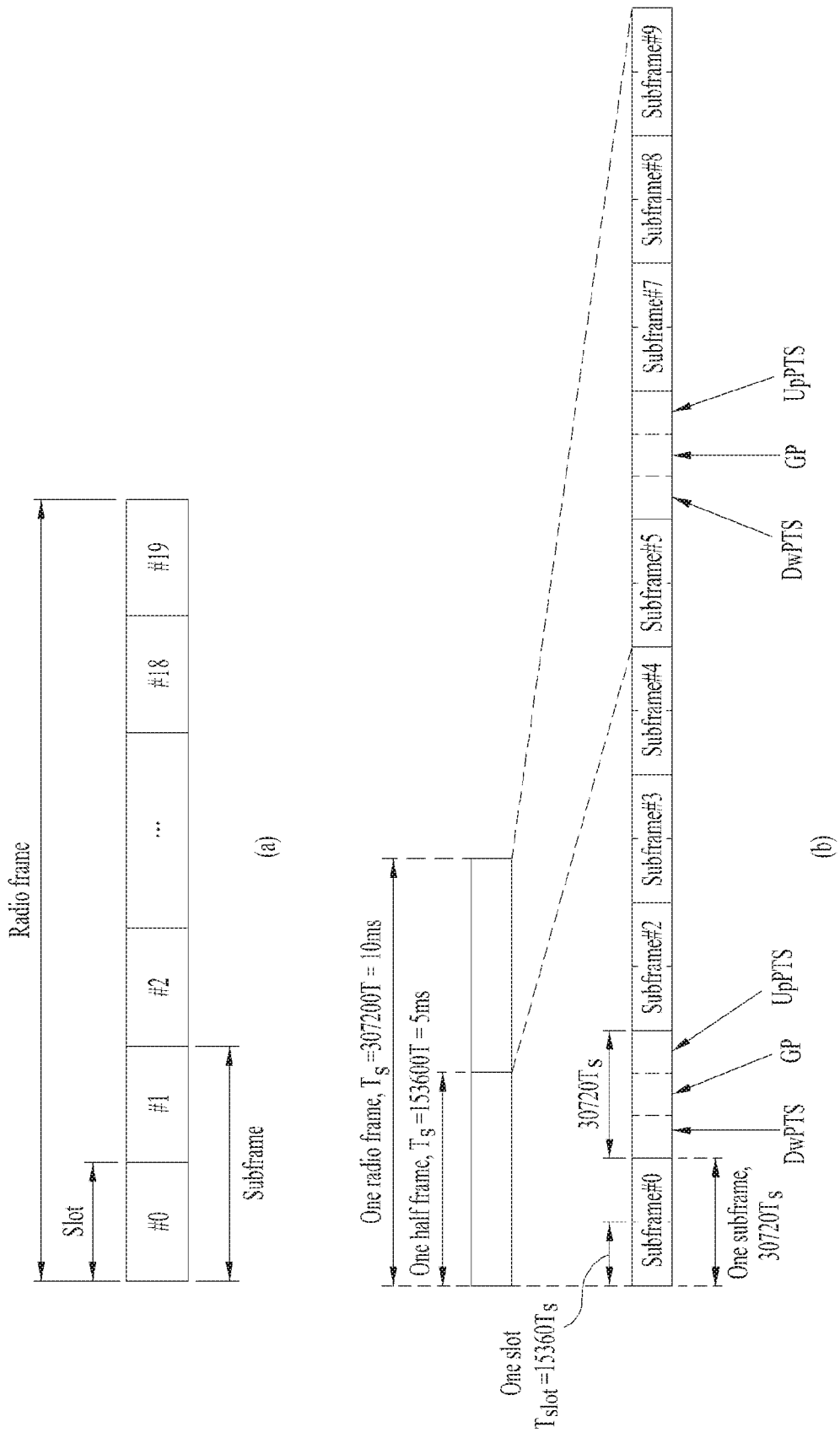
FIG. 4 illustrates a structure of a radio frame used in an LTE/LTE-A system.

FIG. 4 is a diagram illustrating a structure of a radio frame used in an LTE/LTE-A system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |

TABLE 1-continued

| | | Normal cyclic prefix in downlink | | | Extended cyclic prefix in downlink | | |
|---|---|---|---|---|---|---|---|
| | | UpPTS | | | | UpPTS | |
| | | Normal | Extended | | | Normal cyclic | Extended cyclic |
| Special subframe configuration | DwPTS | cyclic prefix in uplink | cyclic prefix in uplink | DwPTS | | prefix in uplink | prefix in uplink |
| 5 | $6592 \cdot T_s$ | $4384 \cdot T_s$ | $5120 \cdot T_s$ | $20480 \cdot T_s$ | | $4384 \cdot T_s$ | $5120 \cdot T_s$ |
| 6 | $19760 \cdot T_s$ | | | $23040 \cdot T_s$ | | | |
| 7 | $21952 \cdot T_s$ | | | $12800 \cdot T_s$ | | | |
| 8 | $24144 \cdot T_s$ | | | — | | — | — |
| 9 | $13168 \cdot T_s$ | | | — | | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
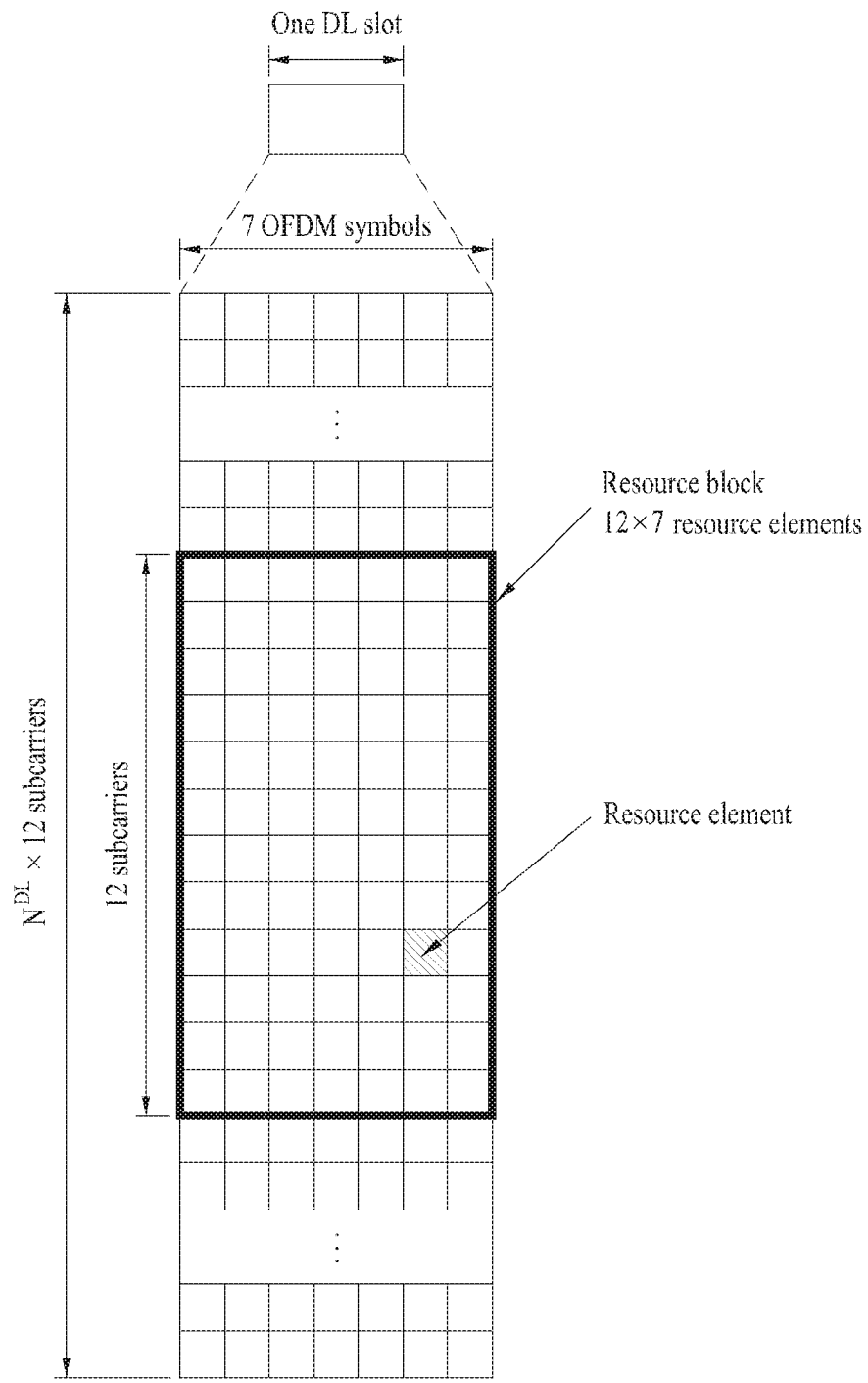
FIG. 5 illustrates a resource grid for a downlink slot.

FIG. 5 illustrates a resource grid for a DL slot.

Referring to FIG. 5, a DL slot includes $N_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
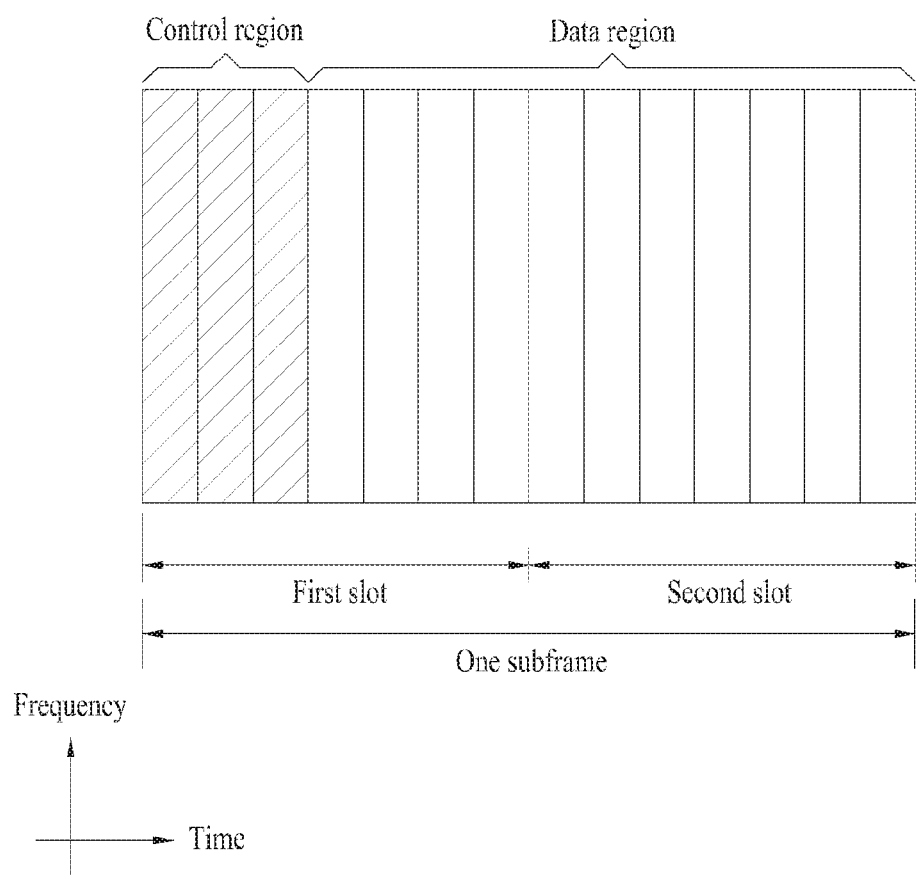
FIG. 6 illustrates a structure of a downlink subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the downlink control channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
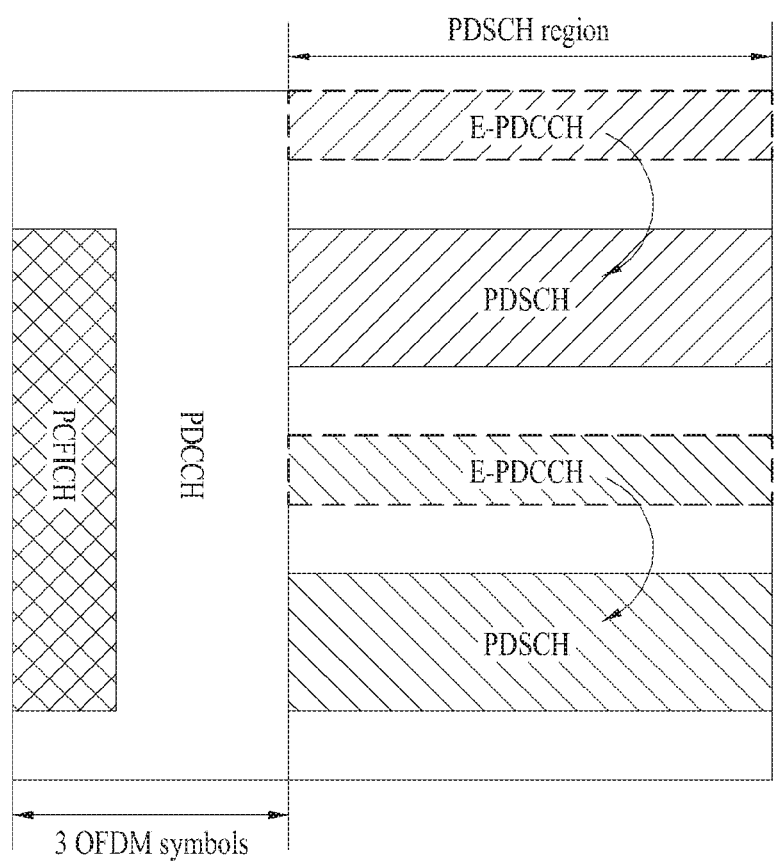
FIG. 7 illustrates EPDCCH and PDSCH scheduled by the EPDCCH.

FIG. 7 illustrates EPDCCH and PDSCH scheduled by the EPDCCH.

Referring to FIG. 7, in general, EPDCCH can be used by defining a portion of a PDSCH region for transmitting data and a user equipment should perform a blind decoding procedure for detecting whether EPDCCH of the user equipment is present. If the number of user equipment that access a node such as RRH while performing the same scheduling operation (i.e., PDSCH and PUSCH control) as legacy PDCCH, a large number of EPDCCHs are allocated to the PDSCH region, whereby the number of times of blind decoding to be performed by the user equipments is increased. Thus, the EPDCCH may have a disadvantage.

2. mmWave Communication System

Figure 8:
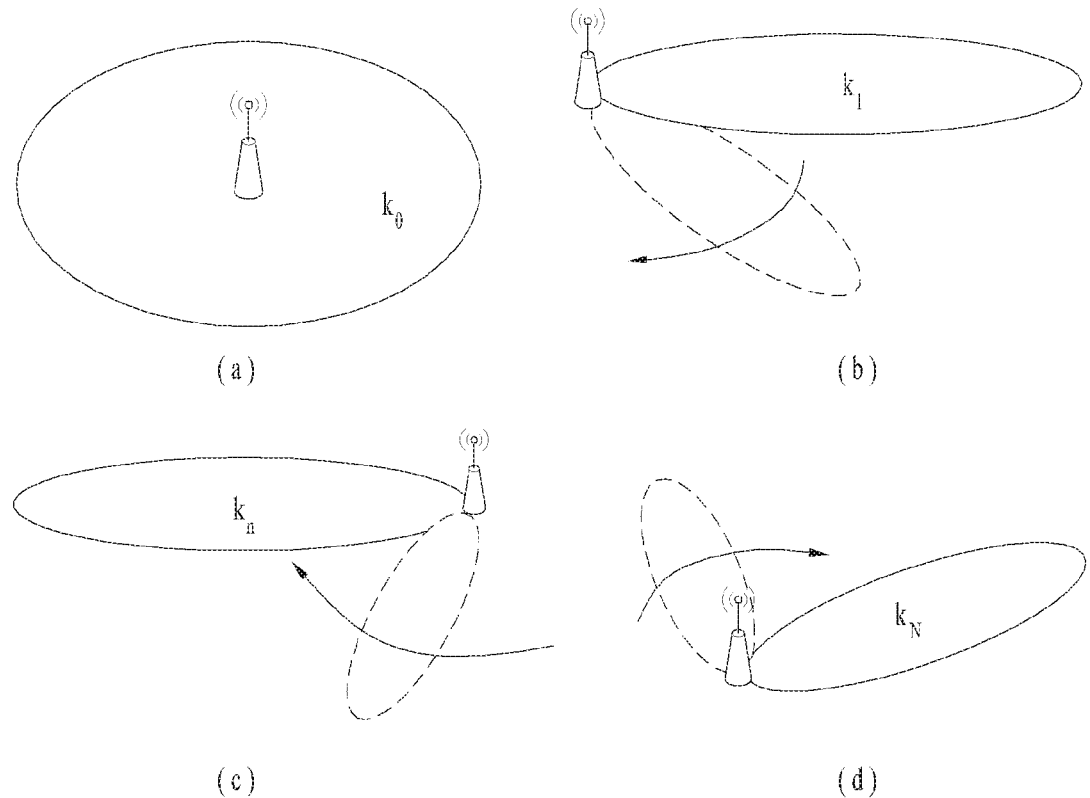
FIG. 8 illustrates cell structures in accordance with beamforming in a mmWave system.

FIG. 8 illustrates cell structures in accordance with beamforming in a mmWave system.

Unlike the conventional system, a new wireless communication system using ultra-high frequency bands (hereinafter referred to as a mmWave system) is designed such that it operates at a center frequency in the range from several GHz to several tens GHz. Since Path Loss (PL) frequently occurs in the ultra-high frequency bands, the mmWave system has a short omni-cell range (cf. FIG. 8(a)).

To solve this problem, the mmWave system is designed to perform beamforming. The beamforming can increase wave propagation distance, and the mmWave system is designed to improve the throughput by spatially changing wave propagation directions of antennas (n=1, 2, . . . , N in FIGS. 8(b), 8(c), and 8(d)) (cf. FIGS. 8(b), 8(c), and 8(d)).

Figure 9:
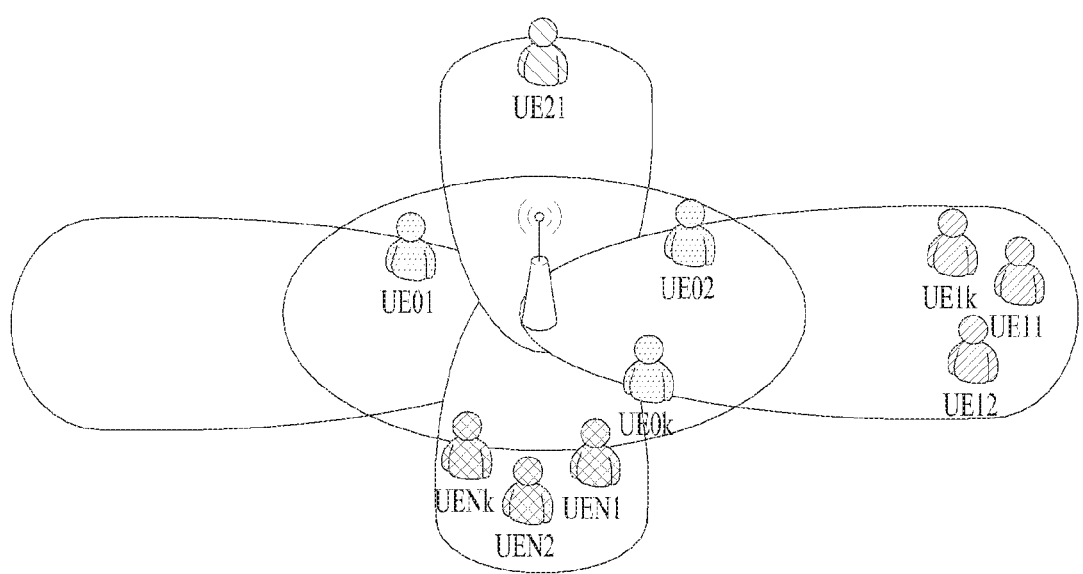
FIG. 9 illustrates a cell structure and UE distribution in the mmWave system

FIG. 9 illustrates a cell structure and UE distribution in the mmWave system.

As described with reference to FIG. 8, one mmWave BS configures a plurality of mmWave cells depending on its beamforming capability. In the example of FIG. 9, a mmWave BS with 90-degree beamforming capability can configure four difference cells, which are geographically different from the omni-cell. When 3-dimensional beamforming is considered, the mmWave BS can configure a total of six different cells.

Figure 10:
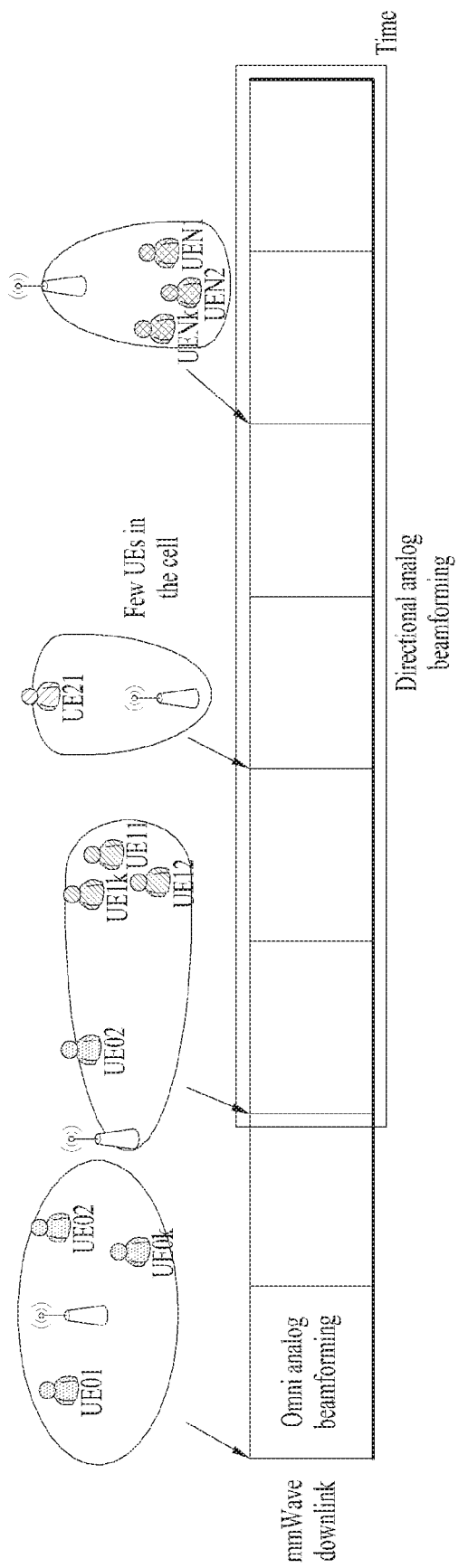
FIG. 10 illustrates a beamforming configuration depending on time at a BS in the mmWave system.

FIG. 10 illustrates a beamforming configuration depending on time at a BS in the mmWave system.

Referring to FIG. 10, UE 01 is connected to the mmWave BS when the Bs configures the omni-cell. On the contrary, when the mmWave BS configures a cell by performing beamforming in a specific direction, UE 01 may be disconnected with the BS. In other words, when a mmWave BS performs beamforming, whether each UE can be connected to the BS is determined according to the beamforming configuration. Thus, the mmWave BS needs to determine the beamforming configuration by considering the locations of UEs in the coverage of the mmWave BS and can perform the beamforming by grouping one or more UEs in a UE group.

In this case, the mmWave BS should determine UE-group-specific transmission configurations (e.g., UL/DL configuration, etc.) in each cell, user-specific transmission configurations in each mmWave cell, and mmWave system information for users in each UE group (which can be broadcast or received through the legacy system) and transmit the configurations and information to UEs.

Meanwhile, the mmWave BS can allocate DL resources using a Time Division Multiple Access (TDMA) scheme according to beamforming directions. For example, as shown in FIG. 10, the mmWave BS may perform beamforming to configure omni-cell in the first and second time intervals and perform directional beamforming in the third to eighth time interval. Specifically, as shown in FIG. 9, the mmWave BS may perform the beamforming in the three-o'clock direction in the third and fourth time intervals, in the twelve-o'clock direction in the fifth to sixth time intervals, and in the six-o'clock direction in the seventh and eighth time intervals.

Figure 11:
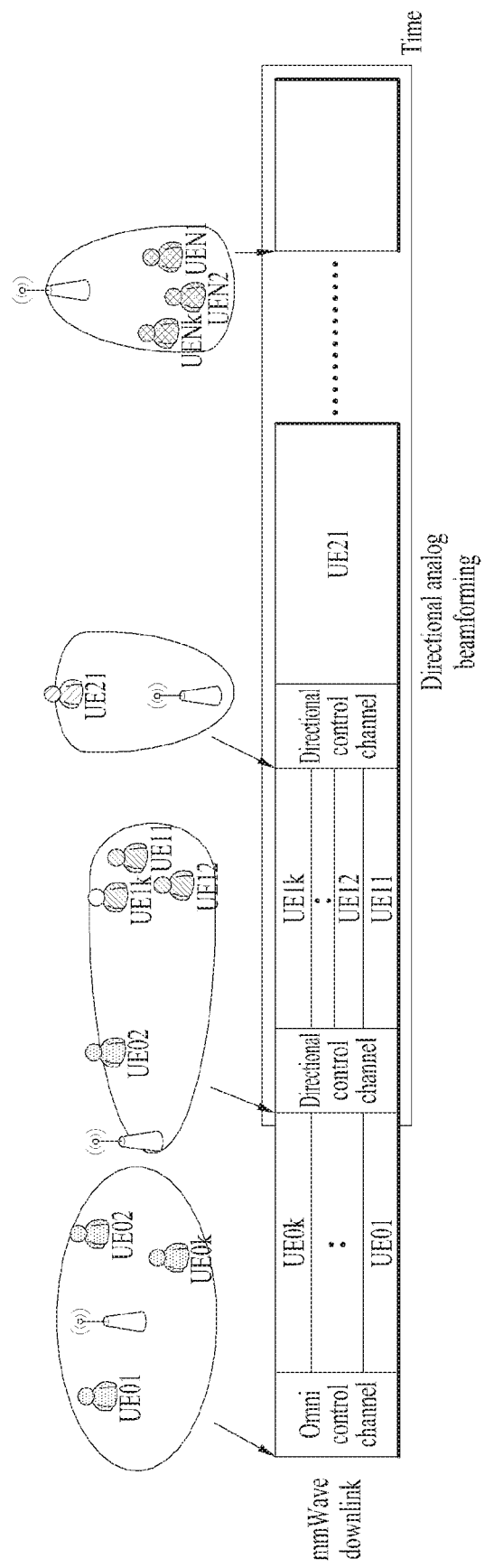
FIG. 11 illustrates scheduling for each UE in a MU-MIMO environment.

FIG. 11 illustrates scheduling for each UE in a MU-MIMO environment. Specifically, FIG. 11 shows an example of the MU-MIMO environment where a plurality of users exist in a cell in the mmWave system. Referring to FIG. 11, it can be seen that when the mmWave system performs beamforming and allocates resources for a specific cell using a TDMA scheme, resources for each cell are distributedly allocated to a plurality of UEs in each cell in the FDD mode. Although FIG. 11 shows that the resources are distributed in the FDD mode, the TDD mode can be applied as well.

Figures 12, 13:
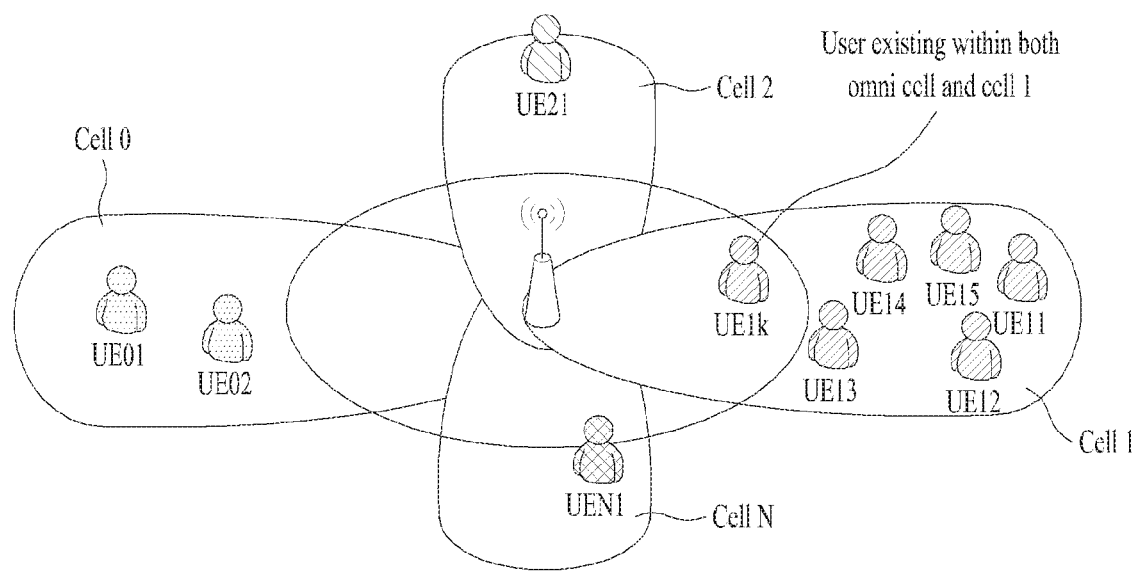
FIG. 12 illustrates a process in which a BS configures UE groups.
FIG. 13 illustrates temporary cell IDs used in the mmWave system.

FIG. 12 illustrates a process in which a BS configures UE groups.

Among the UEs illustrated in FIG. 12, UE $1k$ is located within both the omni-cell configured by a mmWave BS and cell 1 formed by beamforming. In case a UE is located within two or more cell like UE $1k$ of FIG. 12 or in case it is recognized that a UE is located within two or more cells due to external effects (e.g., a Non-Line of Sight (NLoS) link robust to building reflection), the single UE may be repeatedly allocated resources. That is, when multiple UEs are in one cell, the amount of resources to be allocated to another UE may decrease.

From the perspective of a UE, it is most reasonable to select a cell with the highest received signal power by measuring RSRP. However, if there are no UEs within the omni-cell, the UE may achieve the most stable communication in the omni-cell even though the measured RSRP of the omni-cell is the second highest one. On the contrary, if there are multiple other UEs in a beamforming cell with the highest measured RSRP, the UE cannot continuously maintain a good transmission rate due to resources to be allocated to other UEs. In this case, it would be better for the UE to access the omni-cell. In summary, how to configure a UE group(s) to be connected to each cell is an important issue.

To configure a UE group(s) as described above, each UE in the coverage of the mmWave BS should report information about which mmWave cell the UE is being located within to the BS. While transmitting the RSRP measurement report result for each mmWave cell, the UE may transmit identification information capable of identifying each mmWave cell. That is, the UE feeds back the identification information for each mmWave cell together with the RSRP, and the BS can determine which cell the UE should access for the best performance.

The above-described feedback reports a cell to which every RRC-connected UE in the coverage of the mmWave BS is connected. It is transmitted after measuring RSRP (RSRQ) of all cells configured by the single BS. In this case, since the formation of each cell depends on beamforming, a UE feeds back the beamforming index of each cell together with its Global Unique Temporary ID (GUTI) or temporary ID (Temporary Mobile Subscriber Identity (TMSI)).

That is, the feedback information transmitted by a UE may include the beamforming index of a transmitted beam, which is formed by the BS, (or the ID of a beamforming cell) as the identification information for a cell and the GUTI or temporary ID of the UE as the identification information of the UE.

FIG. 13 illustrates temporary cell IDs used in the mmWave system. Specifically, as the identification information of the above-described feedback information, FIG. 13 shows examples of mmWave temporary cell IDs of a BS with 60-degree beamforming capability. In FIG. 13, if a UE located within the coverage of the mmWave BS measures the highest RSRP in a cell with the temporary cell ID of '110', the UE feeds back the temporary cell ID of '110' and its temporary ID (or GUTI) to the BS.

Meanwhile, the UE can transmit the feedback information on a legacy control channel (e.g., PUCCH) or a legacy control channel (e.g., PUSCH) even when a UL connection between the UE and mmWave BS is not established.

Figure 14:
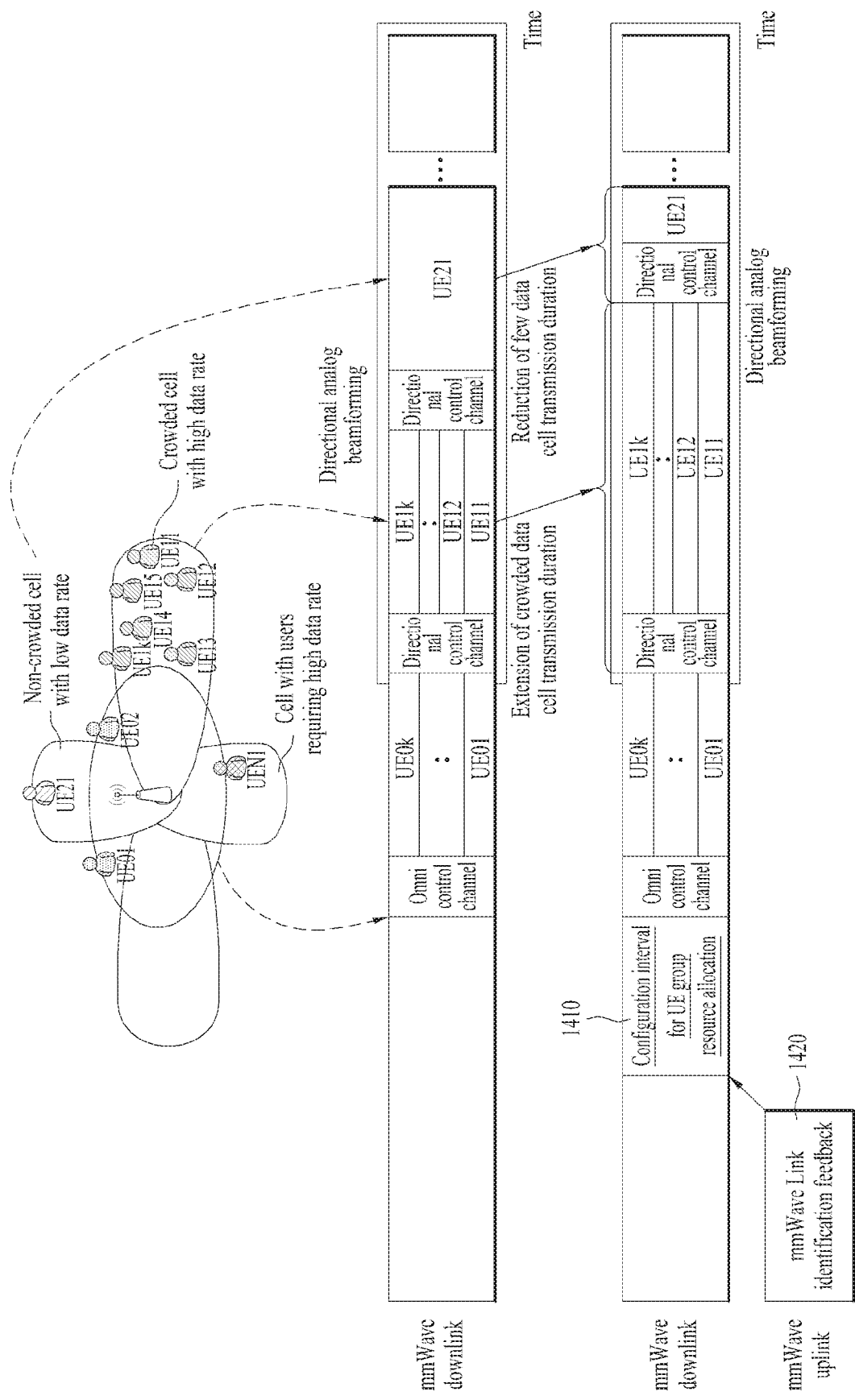
FIG. 14 illustrates a procedure for configuring resource allocation for UE groups.

FIG. 14 illustrates a procedure for configuring resource allocation for UE groups. In FIG. 14, there are few UEs in a cell formed by a mmWave BS through beamforming in the twelve o'clock direction and they require low data transmission rates, but there are many UEs in a cell formed by the mmWave BS through beamforming in the three o'clock direction and they require high data transmission rates.

Even if the UEs are non-uniformly distributed within the mmWave system coverage as described above, resources need to be fairly allocated to the UEs. That is, the resource allocation should be performed by considering the data transmission rate and the number of UEs in each cell. In addition, if the data transmission rate required for a specific UE increases, it is possible to allocate more resources to the corresponding UE.

Meanwhile, the mmWave BS establishes (performs) the configuration for a UE group using the feedback information received from the UE, and the time interval for establishing the configuration is illustrated in FIG. 14. Before configuring a cell, the mmWave BS establishes a configuration for allocating resources for a UE group during a predetermined time interval, and hereinafter, the corresponding time interval is referred to as a "configuration interval for resource allocation". In FIG. 14, the "configuration interval for the resource allocation" is denoted by the number 1410. As described above, the UE should receive feedback information from UEs in order to establish the configuration for the resource allocation, and FIG. 14 shows that the reception of the feedback information [1420] should be prior to the establishment of the configuration interval for the resource allocation.

When the UEs in the cells formed by the mmWave BS transmits feedback [1420], the mmWave BS forms UE groups by identifying users in each cell. Thereafter, the mmWave BS performs the resource allocation for each UE group [1420]. By doing so, each UE in the RRC connected state can know when DL data is transmitted per cell, and the BS can fairly allocate resources to the individual UEs by configuring time intervals for DL data transmission. As shown in FIG. 14, the BS may extend the DL transmission time interval for the UEs in the cell formed in the three o'clock direction and reduce the DL transmission time interval for the UEs in the cell formed in the twelve o'clock direction. Alternatively, in some cases, the BS may unfairly allocate resources to UEs by considering the amount of data required for each UE.

Figure 15:
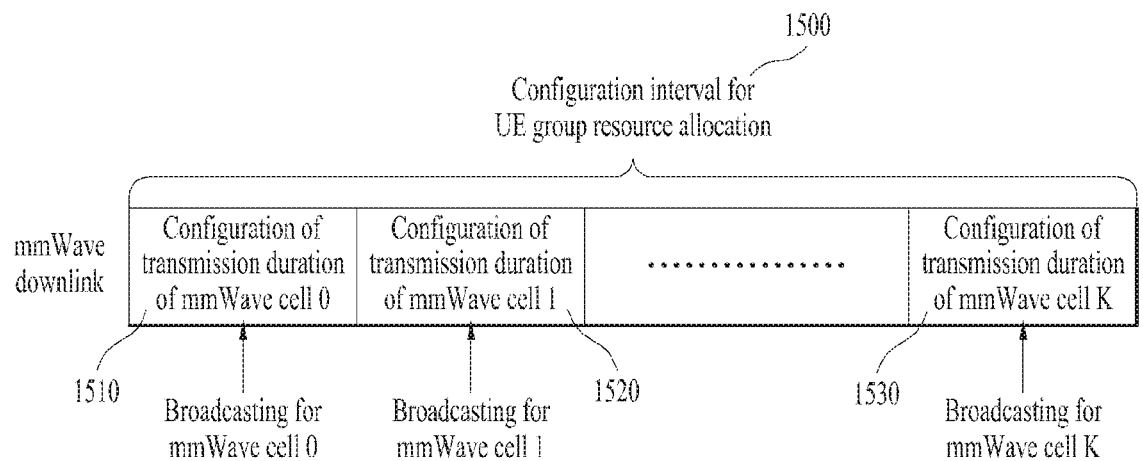
FIG. 15 illustrates in detail a time interval in which resource allocation for UE groups is configured.

FIG. 15 illustrates in detail a time interval in which resource allocation for UE groups is configured.

As described above, when a BS establishes a configuration for resource allocation, the configuration result should be notified to each UE. Thus, the BS segments the configuration interval for the resource allocation 1500 with respect to its configurable cells and then broadcasts the configuration result to UEs in each cell.

For example, the BS configures a time interval 1510 as the time interval for UEs in cell 0 and then broadcasts the configuration result to the UEs in cell 0. Similarly, for time intervals 1520 and 1530, the BS may broadcast the resource allocation results to UEs in each cell, respectively.

Figure 16:
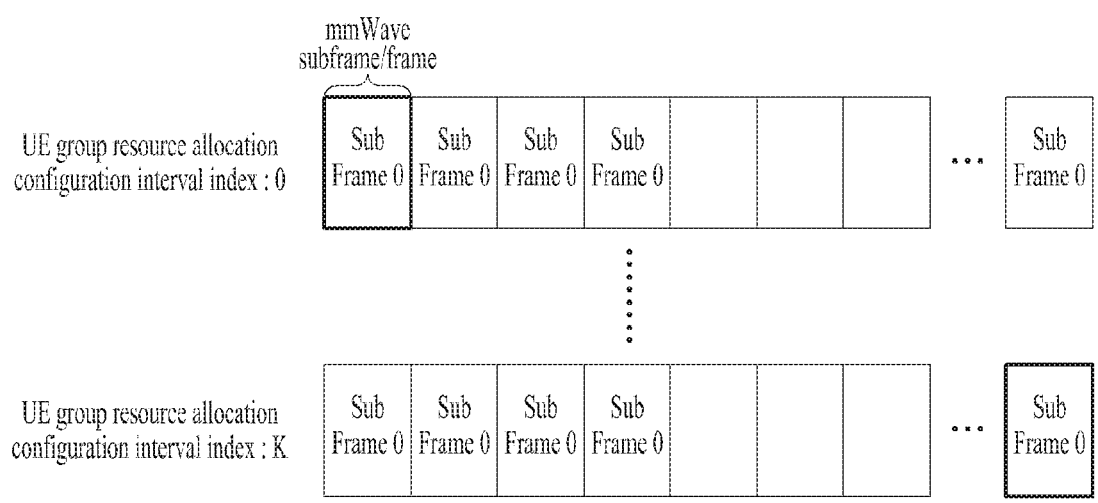
FIG. 16 illustrates a subframe structure where resource allocation for UE groups is configured.

FIG. 16 illustrates a subframe structure where resource allocation for UE groups is configured.

In addition to the contents described in FIG. 15, information broadcast in a time interval for resource allocation may include information on time intervals for resources allocated for each UE group and information on locations of control channels for each UE group.

That is, when the zeroth subframe is allocated for a UE group located in the zeroth cell, a BS may transmit information on subframe 0 and information on a location of a control channel for the UE group in subframe 0 to UEs. Similarly, when the Kth subframe is allocated for a UE group located in the Kth cell, the BS may transmit information on subframe K and a location of a control channel in subframe K to UEs.

In addition, it is apparent that two or more subframes can be allocated for one UE group unlike this example.

Figure 17:
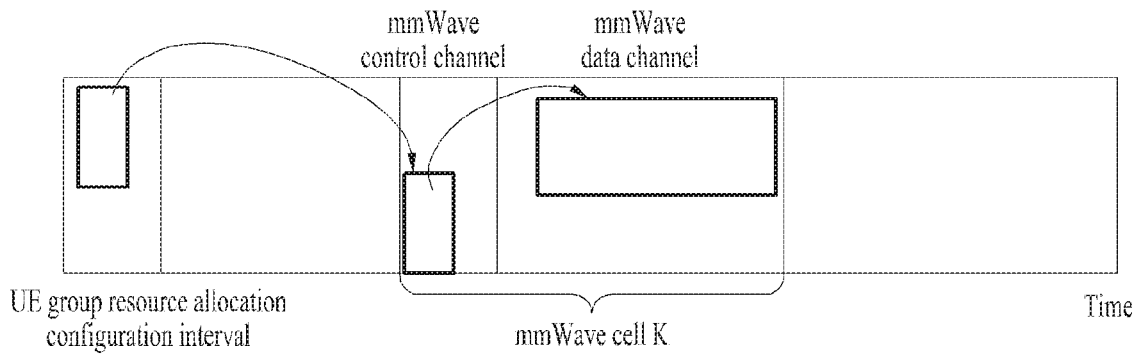
FIG. 17 illustrates a data decoding process for a mmWave UE in the Kth cell.

FIG. 17 illustrates a data decoding process for a mmWave UE in the Kth cell. Specifically, continuing the example illustrated in FIG. 16, FIG. 17 shows how the UE in the Kth cell decodes DL data.

First, UEs receive information broadcast by a BS in a configuration interval for resource allocation. As described above, the broadcast information may contain information on time intervals for resources allocated for the UEs and information on the locations of control channels. Thereafter, the UEs performs blind decoding using the received information on the control channel locations to detect a control channel in a subframe for the Kth UE group. After decoding the control channel, the UEs can decode data transmitted on a data channel using information included in the control channel.

Figure 18:
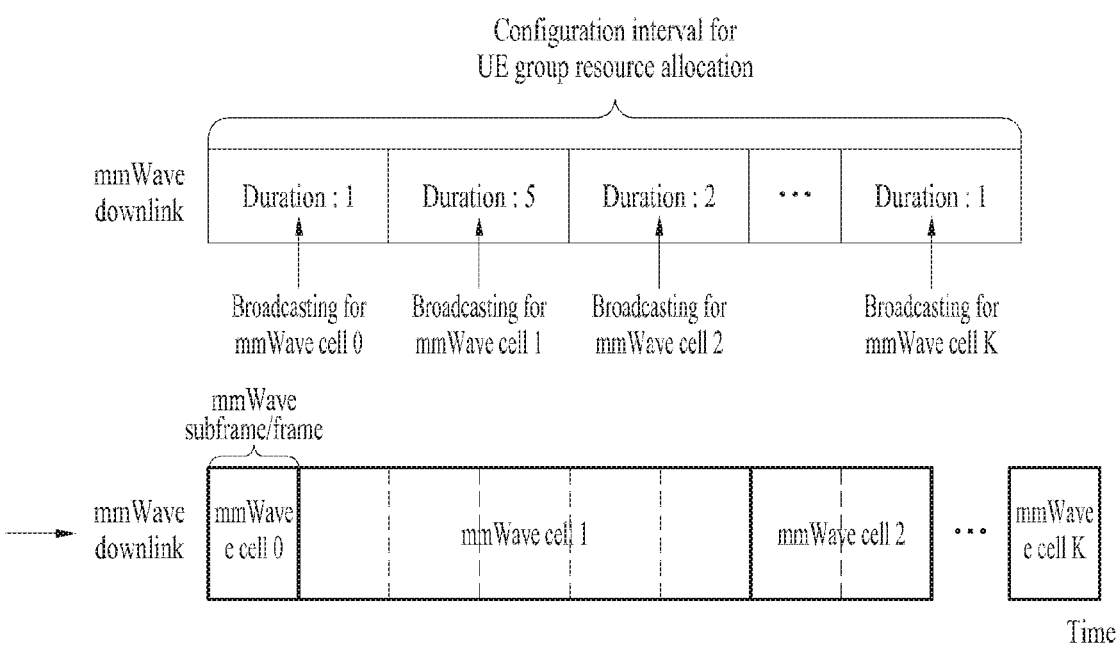
FIG. 18 illustrates an interval for resource allocation and the resource allocation in accordance therewith.

FIG. 18 illustrates an interval for resource allocation and the resource allocation in accordance therewith. Specifically, FIG. 18 shows an example of allocating a different time interval per cell based on the example of FIG. 15.

In a configuration interval for resource allocation, a BS configures one time interval (for example, a subframe) for the zeroth cell, five time intervals for the first cell, two time intervals for the second cell, and one time interval for the Kth cell. By doing so, the BS may configure each cell through beamforming and transmit DL data during time intervals based on the lengths defined in the configuration interval for the resource allocation. That is, the BS performs mmWave DL data transmission during one subframe for the zeroth cell, performs mmWave DL data transmission during five subframe for the first cell, and performs mmWave DL data transmission during one subframe for the Kth cell.

Figure 19:
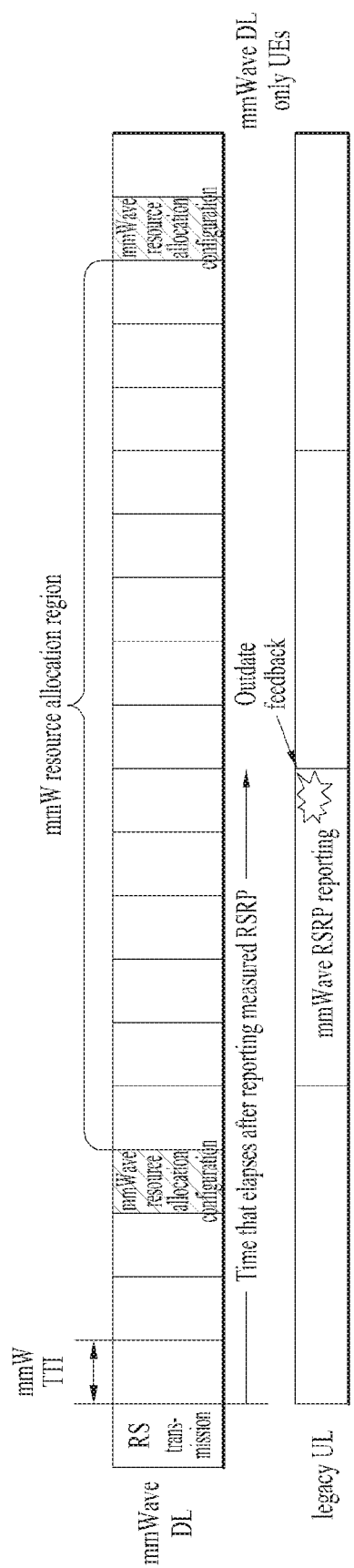
FIG. 19 illustrates outdated feedback that occurs due to a Transmission Time Interval (TTI).

FIG. 19 illustrates outdated feedback that occurs due to a Transmission Time Interval (TTI).

Based on the above discussion, described is a case in which a UE supporting mmWave DL and legacy UL is in the coverage of a mmWave BS. In this case, the UE should transmit feedback in the legacy UL after measuring mmWave RSRP. However, if the TTI of the mmWave DL is different from that of the legacy UL, the feedback information received in the legacy UL may be outdated from the perspective of the BS. Here, the outdated information may mean obsolete information that does not reflect the current channel state. In other words, the transmission of the mmWave DL feedback in the legacy UL may cause a problem that the channel state of the UE is not accurately reflected.

Therefore, the mmWave UL should be considered to provide feedback of the mmWave RSRP and mmWave channel state. Alternatively, the open-loop based resource allocation where no feedback is provided needs to be performed. Hereinafter, a system supporting mmWave DL feedback and a method for configuring mmWave DL and UL based on TDD for the purpose of avoiding outdated information will be described.

3. Proposed Communication Method in mmWave System

Assuming that a person runs at a speed of about 14.4 km/h and walks at a speed of about 4.8 km/h, a power difference between Line of Sight (LoS) and NLoS environments is calculated to be about 15 dB within a distance of 5 m. Based on this, a power difference between the LoS and NLoS at a distance of 100 m is considered as about 45 dB.

Considering that the LoS/NLoS transition time of a person who walks at a speed of 0.6 m/s is about 150 ms, a change in the LoS/NLoS transition time due to an object moving at a speed of 10 m/s can be estimated as about 9 ms. Such a transition time change could be shorter in some cases where a hand holding a UE suddenly swings or an obstacle moves. Table 3 shows the results thereof.

TABLE 3

|  | Walking (0.6 m/s) | Sprinting (10 m/s) | Swift Hand swing (43 m/s) |
| --- | --- | --- | --- |
| LoS/NLoS transition | 150 ms | 9 ms | 2.093 ms |

Figure 20:
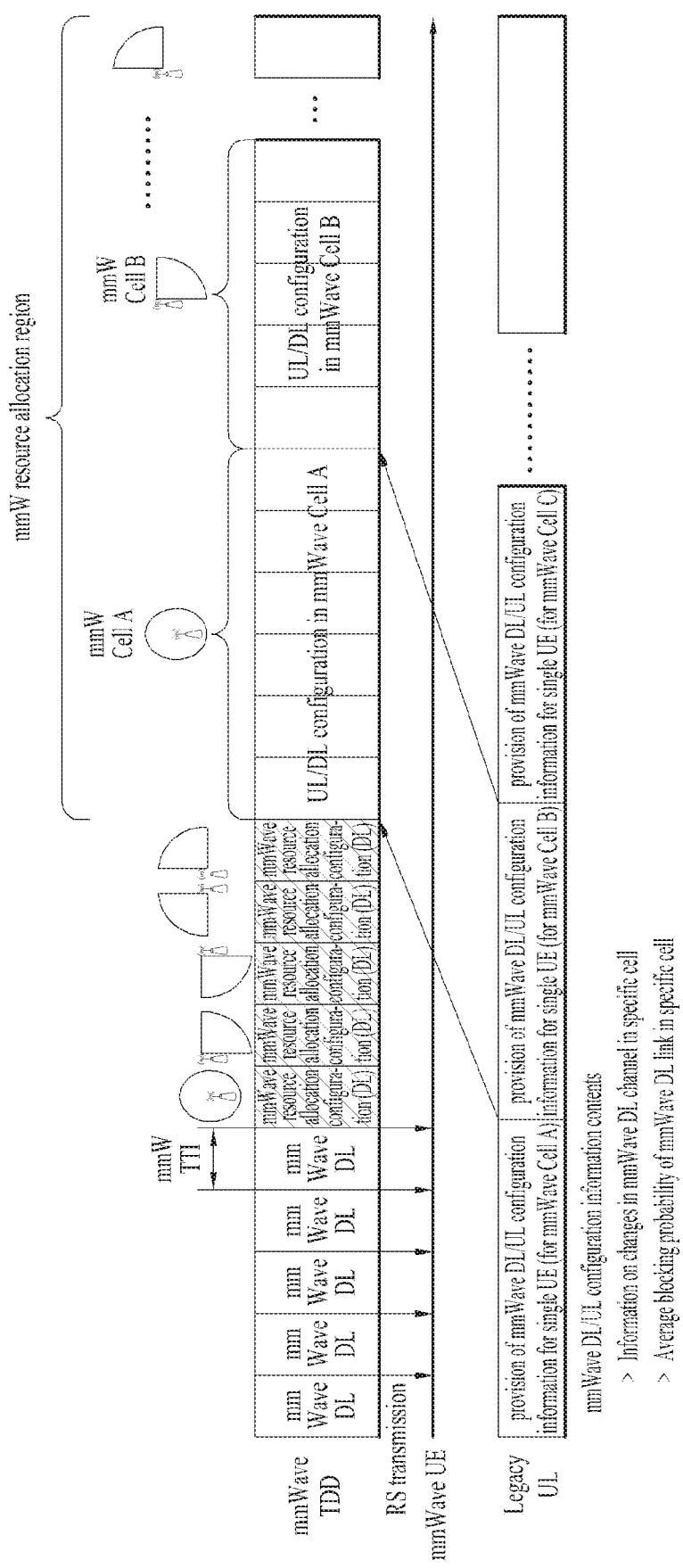
FIG. 20 illustrates a process in which a UE transmits information for a UL/DL configuration in UL and a mmWave BS establishes the UL/DL configuration.

FIG. 20 illustrates a process in which a UE transmits information for a UL/DL configuration in UL and a mmWave BS establishes the UL/DL configuration.

Specifically, FIG. 20 shows an example of the process in which mmWave UL and DL configurations are established based on TDD. In FIG. 20, it is assumed that not only synchronization between mmWave DL and UL but synchronization between mmWave UL/DL and legacy UL/DL is established. The processes for matching the synchronization will be described later.

First, the UE measures information on a DL channel using a received Reference Signal (RS) in a mmWave cell. For example, the UE may measure a change in the mmWave DL channel in a specific cell configured by the mmWave BS or the probability that the DL connection is blocked in the specific cell. Referring to the five mmWave TTIs on the left of FIG. 20, it can be seen that when the mmWave BS transmits a Reference Signal (RS) in DL according to the DL/UL configuration, the UE measures information on a mmWave DL channel using the received RS in a specific cell.

Thereafter, the UE transmits the measured information on the DL channel to the mmWave BS. The mmWave BS uses the information on the DL channel to establish a UL/DL configuration for the specific cell. In other words, the mmWave BS can reconfigure or maintain the UL/DL configuration by considering the information on the DL channel received from the UE. As shown in the sixth to tenth mmWave TTIs of FIG. 5, the mmWave BS may establish UL/DL configurations for individual cells that the BS can configure according to its beamforming capability and use channel information with respect to the individual cells, which is received from UEs, to establish the UL/DL configurations. Meanwhile, the UEs may transmit information on mmWave DL channels to the mmWave BS in legacy UL.

When determining all the UL/DL configurations for the cells that the mmWave BS can configure, the mmWave BS configures the cells through beamforming and then starts communication with the UEs. As shown in the eleventh to sixteenth mmWave TTIs of FIG. 20, the mmWave BS configures an omni-cell (cell A) and then performs communication according to the UL/DL configuration for cell A. In the subsequent seventeenth to twenty-second mmWave TTIs, the mmWave BS configures cell B and then performs communication according to the UL/DL configuration for cell B. The arrows illustrated in the legacy UL of FIG. 20 indicate that the UL/DL configurations applied by the mmWave BS to the individual cells are determined based on channel information feedback by the UEs.

Meanwhile, the reason why the UEs transmit information for the mmWave UL/DL configurations in the legacy UL is to transmit stably the results obtained by statistically analyzing the channel changes, which are measured using the RSs in the mmWave cells. In other words, since a UE statistically analyzes channel changes such as LoS/NLoS transition, blocking caused by a moving obstacle, etc., and the mmWave BS should correctly receive the analyzed results to establish a UL/DL configurations, the UE can transmit information for the UL/DL configuration in the stable legacy UL.

Figure 21:
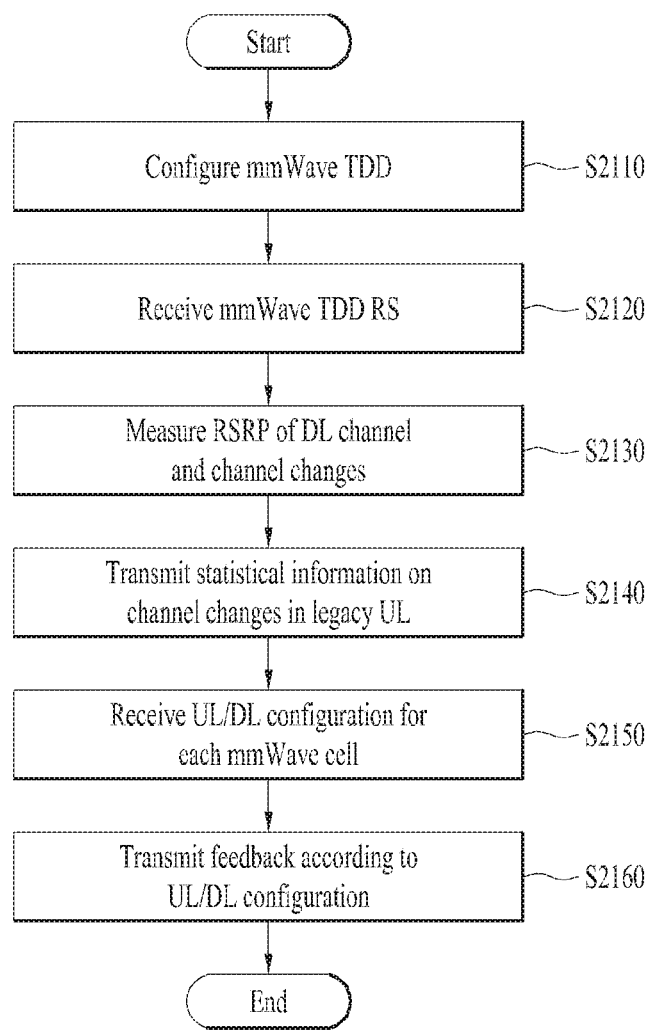
FIG. 21 is a flowchart illustrating in detail a process for transmitting information on a UL/DL configuration.

FIG. 21 is a flowchart illustrating in detail a process for transmitting information on a UL/DL configuration. Specifically, FIG. 21 shows the process described with reference to FIG. 20 with the passage of time.

First, a mmWave BS configures mmWave UL and mmWave DL based on TDD and establishes a default configuration for mmWave TDD [S2110]. Meanwhile, the mmWave BS can broadcast information on the mmWave TDD by including it in a mmWave System Information Block (SIB). Upon receiving the mmWave SIB, a UE can obtain the default information determined by the mmWave BS (e.g., UL/DL configuration, etc.) and achieve synchronization between legacy UL and mmWave UL/DL.

Next, the mmWave BS transmits an RS to the UE during a DL time interval according to the default UL/DL configuration, and the UE receives the RS [S2120]. The UE measures RSRP of the mmWave DL using the received RS and measures channel changes in the mmWave DL [S2130]. Here, the measurement of the channel changes in the mmWave DL could be interpreted to measure relative changes with respect to the legacy link.

The mmWave BS transmits statistical information on the channel changes, which was measured in step S2130, to the mmWave BS in the legacy UL [S2140]. A process for generating statistical information will be described later in detail with reference to FIGS. 22 to 24. Meanwhile, the statistical information transmitted by the UE in step S2140 may be information for a UL/DL configuration(s) mentioned above with reference to FIG. 20. That is, the mmWave BS establishes UL/DL configurations for individual mmWave cells using the statistical information received from the UE and then transmits results thereof to the UE. In other words, the UE receives information on the UL/DL configurations for the individual mmWave cells from the mmWave BS [S2150].

In step S2150, the UE decodes the received information and obtains the UL/DL configurations. Thereafter, the UE transmits feedback in accordance with each of the configurations to the mmWave BS [S2160]. In this case, the UL feedback transmission time may be determined according to the received UL/DL configurations.

Figure 22:
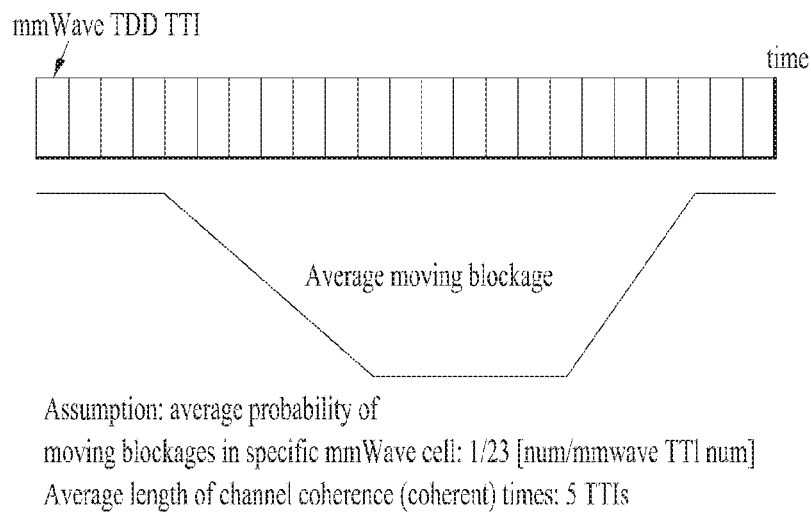
FIG. 22 illustrates a default UL/DL configuration.

FIG. 22 illustrates a default UL/DL configuration.

As described in step S2110 of FIG. 21, while configuring mmWave UL and DL based on TDD, a mmWave BS establishes a default UL/DL configuration. Meanwhile, since the mmWave BS establishes the default UL/DL configuration before receiving channel change feedback from a UE, it depends on average information of mmWave cells that the mmWave BS already knows.

It is assumed that the K UL/DL configurations shown in FIG. 22(b) are configured with respect to the 23 mmWave TTIs shown in FIG. 22(a). If the average probability of moving blockages in a specific cell is 1/23 (the number of times/the number of mmWave TTIs) is 1/23, the mmWave BS may set the average length of channel coherence (coherent) times to 5 TTIs. Thus, the mmWave BS selects, as the default configuration, the zeroth UL/DL configuration from among the K UL/DL configurations.

Figure 23:
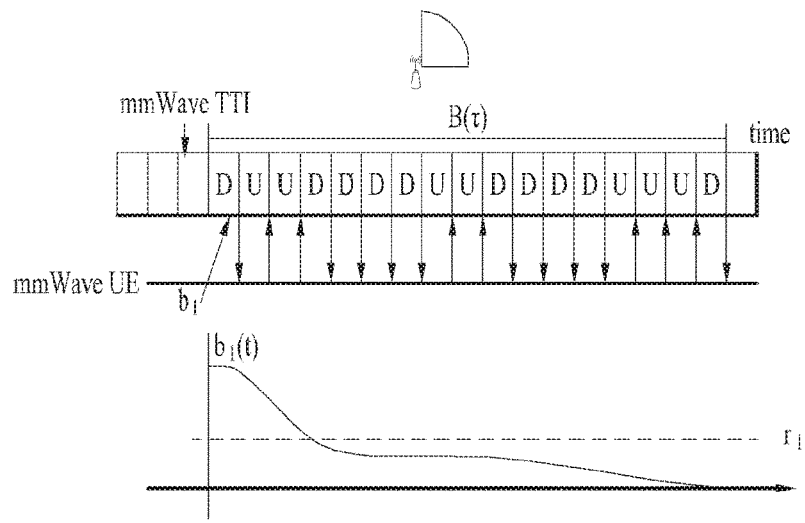
FIG. 23 illustrates a process in which a UE measures statistics of channel changes.

FIG. 23 illustrates a process in which a UE measures statistics of channel changes. Hereinafter, statistical information on channel changes, which is mentioned in steps S2130 and S2140 of FIG. 21, will be described in detail with reference to FIG. 23.

When a mmWave BS configures a specific cell through beamforming and performs communication according to a default UL/DL configuration, a UE can generate statistical information on a channel using an RS from the mmWave BS. Specifically, the UE can compute the degree of coherence from the channel information, and in this case, Equation 1 below can be used for the coherence calculation.

$$A_1(t) = \frac{1}{T} \int B(\tau) * b_1(t-\tau) d\tau \qquad \text{[Equation 1]}$$

Equation 1 describes a process for measuring cross correlation depending on time. In Equation 1, $A_1(t)$ indicates a cross correlation value, $b_1(t-\tau)$ indicates a channel of an RS measured in the tth TTI, and $B(\tau)$ indicates an impulse response for the channel of the RS.

Referring to the graph at the bottom of FIG. 23, the UE measures TTIs based on a coherent time until the cross correlation measured according to Equation 1 becomes equal to or more than a threshold, $\gamma_1$. Equation 2 below shows the degree of coherence computed by the UE.

$$\hat{n}_k = \underset{n_k}{\mathrm{argmax}} \|A_k(t) \le \gamma_k\| \qquad \text{[Equation 2]}$$

In Equation 2, $n_k$ indicates the number of estimated TTIs that represent the degree of coherence in the kth TTI.

Figure 24:
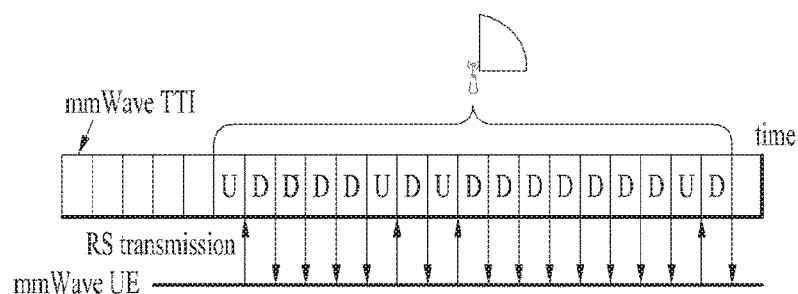
FIG. 24 illustrates an example in which a UL/DL configuration is modified according to statistics of channel changes.
Figure 24:
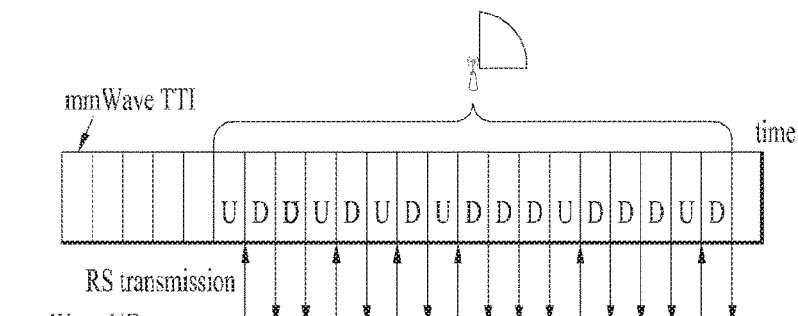

FIG. 24 illustrates an example in which a UL/DL configuration is modified according to statistics of channel changes.

As described above, when a UE generates statistical information on a channel and transmits the information to a mmWave BS in legacy UL, the mmWave BS selects or determines a UL/DL configuration for a specific cell by considering the received information. That is, the mmWave BS may obtain information on a coherent time of the changed channel in the specific cell and then modify the UL/DL configuration by considering the channel state.

That is, in case a mmWave BS selects a default UL/DL configuration as shown in FIG. 24(a) and receives, from a UE, information indicating that a coherent time for a specific cell is 4 TTIs, the mmWave BS can modify the UL/DL configuration as shown in FIG. 24(b). In other words, the mmWave BS can determine the UL/DL configuration adaptively to channel changes. By transmitting the new UL/DL configuration to the UE and performing communication with the UE according to the new UL/DL configuration, it is possible to avoid feedback information transmitted by the UE from being outdated.

4. Device Configuration

Figure 25:
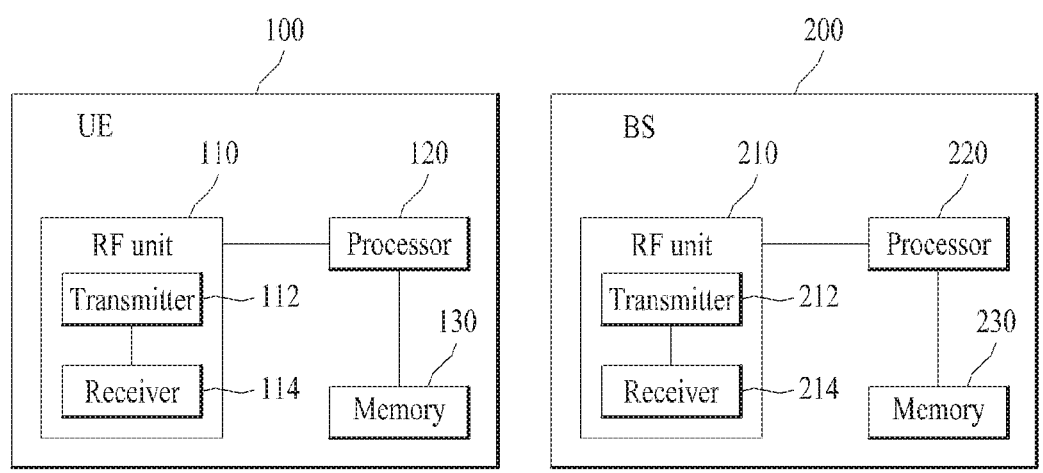
FIG. 25 is a block diagram illustrating configurations of a UE and a BS according to an embodiment of the present invention.

FIG. 25 is a block diagram showing the configuration of a user equipment and a base station according to one embodiment of the present invention. In FIG. 25, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 25, a communication environment may be established between a plurality of user equipment and the base station. In addition, the base station 200 shown in FIG. 25 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The above-described communication method in a mmWave system can be applied to not only the 3GPP system but also various wireless communication systems including IEEE 802.16x and IEEE 802.11x systems.

What is claimed is:

1. A communication method for a User Equipment (UE) supporting a millimeter wave (mmWave) communication system, the method comprising:
   receiving information on a default uplink/downlink (UL/DL) configuration from a mmWave Base Station (BS);
   generating statistical information on a mmWave DL channel using a reference signal received from the mmWave BS according to the default UL/DL configuration;
   transmitting the statistical information to the mmWave BS via legacy UL;
   receiving, from the mmWave BS, information on a UL/DL configuration that is modified based on the statistical information,
   wherein the information on the default UL/DL configuration is received from a mmWave System Information Block (SIB) broadcast by the mmWave BS, and
   aligning synchronization of mmWave UL, mmWave DL, and the legacy UL using the mmWave SIB.

2. The method of claim 1, wherein the statistical information includes information on changes of the mmWave DL channel and information on average blocking probability of the mmWave DL.

3. The method of claim 1, wherein the mmWave communication system is configured to a Time Division Duplex (TDD) system.

4. The method of claim 1, wherein the statistical information is information on any one cell among a plurality of beamforming cells that can be configured by the mmWave BS.

5. The method of claim 4, further comprising performing communication with the mmWave BS in the any one cell according to the modified UL/DL configuration.

6. A User Equipment (UE) for supporting a millimeter wave (mmWave) communication system, the UE comprising:
   a transmitter;
   a receiver; and
   a processor connected to the transmitter and the receiver,
   wherein the processor is configured to:
   control the receiver to receive information on a default uplink/downlink (UL/DL) configuration from a mmWave Base Station (BS);
   generate statistical information on a mmWave DL channel using a reference signal received from the mmWave BS according to the default UL/DL configuration;
   control the transmitter to transmit the statistical information to the mmWave BS via legacy UL;
   control the receiver to receive, from the mmWave BS, information on a UL/DL configuration that is modified based on the statistical information,
   wherein the information on the default UL/DL configuration is received from a mmWave System Information Block (SIB) broadcast by the mmWave BS, and
   align synchronization of mmWave UL, mmWave DL, and the legacy UL using the mmWave SIB.

7. The UE of claim 6, wherein the statistical information includes information on changes of the mmWave DL channel and information on average blocking probability of the mmWave DL.

8. The UE of claim 6, wherein the mmWave communication system is configured to a Time Division Duplex (TDD) system.

9. The UE of claim 6, wherein the statistical information is information on any one cell among a plurality of beamforming cells that can be configured by the mmWave BS.

10. The UE of claim 9, wherein the processor is configured to perform communication with the mmWave BS in the any one cell according to the modified UL/DL configuration.

* * * * *